United States Patent
Lee et al.

(10) Patent No.: US 7,499,144 B2
(45) Date of Patent: Mar. 3, 2009

(54) APPARATUS FOR INJECTING LIQUID CRYSTAL INTO HOLLOW FIBER AND METHOD THEREOF

(75) Inventors: Young-Wook Lee, Daejeon (KR); Yong-Gi Lee, Daejeon (KR)

(73) Assignee: KT Corporation (KR)

( * ) Notice: Subject to any disclaimer, the term of this patent is extended or adjusted under 35 U.S.C. 154(b) by 193 days.

(21) Appl. No.: 11/684,538

(22) Filed: Mar. 9, 2007

(65) Prior Publication Data

US 2007/0211190 A1    Sep. 13, 2007

Related U.S. Application Data

(63) Continuation of application No. PCT/KR2005/002992, filed on Sep. 10, 2005.

(30) Foreign Application Priority Data

Sep. 10, 2004   (KR) ...................... 10-2004-0072423

(51) Int. Cl.
  *G02F 1/13*    (2006.01)
  *G02B 6/02*    (2006.01)
(52) U.S. Cl. ........................ 349/193; 349/187; 385/125; 137/15.01
(58) Field of Classification Search ................. 349/187, 349/193; 385/125; 137/15.01
   See application file for complete search history.

(56) References Cited

U.S. PATENT DOCUMENTS 4,201,446 A    5/1980   Geddes et al.

| 2004/0136670 A1 | 7/2004 | Abeeluck et al. |
| 2005/0169590 A1* | 8/2005 | Alkeskjold ................. 385/123 |

FOREIGN PATENT DOCUMENTS

| JP | 54-156653 A | 12/1979 |
| JP | 55-164810 | 12/1980 |
| JP | 2004-220035 | 8/2004 |
| KR | 10-2004-0033976 A | 4/2004 |
| WO | 2006/028358 A1 | 3/2006 |

OTHER PUBLICATIONS

International Search Report from corresponding application PCT/KR2005/002992 dated Dec. 21, 2005 in 3 pages.
Notice of Allowance from corresponding application KR 10-2004-0072423 dated Apr. 30, 2008 in 2 pages.

* cited by examiner

*Primary Examiner*—Michael H Caley
(74) *Attorney, Agent, or Firm*—Knobbe Martens Olson & Bear LLP

(57) ABSTRACT

Provided are an apparatus and a method for injecting liquid crystal into a hollow optic fiber. The apparatus includes: a first holder and a second holder each of which has a fluid passage for holding corresponding one end of the hollow optic fiber to be communicated with the fluid passage a container connected to a tube disposed with a valve at the fluid passage of the second holder and storing liquid crystal; an air supplying device connected to the first holder and the container through tubes having a plurality of valves to select an air passage for making the hollow optic fiber vacuous by sucking air out of the hollow optic fiber and forcedly injecting liquid crystal into the hollow optic fiber by supplying an air pressure.

6 Claims, 3 Drawing Sheets

APPARATUS FOR INJECTING LIQUID CRYSTAL INTO HOLLOW FIBER AND METHOD THEREOF

CROSS-REFERENCE TO RELATED PATENT APPLICATIONS

This application is a continuation application under 35 U.S.C. § 365(c) of International Application No. PCT/KR2005/002992, filed Sep. 10, 2005 designating the United States. International Application No. PCT/KR2005/002992 was published in English as WO2006/028358 A1 on Mar. 16, 2006. This application further claims the benefit of the earlier filing dates under 35 U.S.C. §365(b) of Korean Patent Application No. 10-2004-0072423 filed Sep. 10, 2004. This application incorporates herein by reference the International Application No. PCT/KR2005/002992 including the International Publication No. WO2006/028358 A1 and the Korean Patent Application No. 10-2004-0072423 in their entirety.

BACKGROUND

1. Field

The present invention relates to an apparatus for injecting liquid crystal into a hollow fiber or a planar waveguide and a method thereof, and more particular, to an apparatus for injecting liquid crystal into a hollow optic fiber after making the inside of the long hollow fiber vacuous to overcome resisting force generated by a surface tension of the liquid crystal and an inside surface of the hollow fiber, and a method thereof.

2. Discussion of Related Technology

Since a liquid crystal is in a liquid state and includes large size molecules having electric aeolotropy, the liquid crystal has variable double refraction characteristics changed according to arrangement of the molecules. Therefore, the liquid crystal has been widely used not only to a display device such as a television or a computer monitor but also to various optical devices using polarized waves such as a polarizer and a quarter wave retarder.

An optical communication system and an optic fiber sensor system generally employ Bulk Optics as liquid crystal optic components. Basically, light is extracted from the optic fiber and the extracted light is collimated. The collimated light is passed through small size films or boxes, and then the passed light is re-injected into the optic fiber. Since the liquid crystal technology using the Bulk Optics extracts and reinserts the light, insertion loss of light is inevitable. Also, the liquid crystal technology using the Bulk Optics is badly influenced by temperature variation and external environment because it requires a mechanical device that arranges light beam in a spatial domain.

Recently, there are many researches in progress to develop a device using liquid crystal for compensating polarization mode dispersion (PMD) that is a major factor of limiting high speed optical transmission faster than 10 Gbps. For example, if a PMD compensating unit is embodied using the liquid crystal optic fiber, the insertion loss of light can be reduced drastically because the PMD compensating unit is basically a kind of the optic fiber. Furthermore, a polarizer installed between the liquid crystal optic fiber and an optical transmission line can be embodied with the same liquid crystal optic fiber. Accordingly, the shape of the PMD compensating unit can be simplified. Moreover, the reliability of the device is improved and the manufacturing cost is reduced since a mechanical device for light collimation is not required.

In case of the PMD compensating unit using a liquid crystal optic fiber, the length of the optic fiber using in the PMD compensating unit is decided according to a maximum value of PMD to compensate and a type of a liquid crystal. The length of the liquid crystal optic fiber may need to be several meters or several tens meters to compensate PMD of several tens ps.

In order to inject the liquid crystal into a hollow optic fiber, one end of the optic fiber soaks in a container having liquid crystal and other end of the optic fiber is straight up or slightly inclined. Then, the liquid crystal is naturally inserted into the hollow optic fiber by capillarity.

Although such a method of inserting using the capillarity is very simple, the length of the optic fiber is limited to several centimeters and it takes several days to insert the liquid crystal into the hollow optic fiber. Therefore, it is impossible to insert the liquid crystal into the hollow optic fiber of the several meters or the several tens meters. It is also impossible to manufacture a PMD compensating device requiring the hollow optic fiber of the several meters and the several tens meters.

As described above, insertion of liquid crystal into long hollow optic fiber is major factor to apply the liquid crystal optic fiber to the PMD compensating device.

One of difficulties for inserting the liquid crystal into the long hollow optic fiber is dynamic variation. The dynamic variation arises when the liquid crystal flows in a pipe having a diameter of several micrometers. That is, dynamics of the liquid crystal flowing in the pipe of several micrometers is completely different from that of the liquid crystal flowing in a pipe having a diameter of several centimeters or server meters. Such a dynamic variation is called as a micro fluid dynamics. The dynamic variation arises by interaction between the liquid crystal molecule, which is electric dipole, and the surface of the pipe. The dynamic variation becomes un-ignobrale if the diameter of the pipe is several times larger that the liquid crystal molecule. That is, the dynamics of the liquid crystal molecule will be badly influenced by the surface of the pipe. When the liquid crystal flows through the pipe having the diameter of several micrometers, the pulling power of the surface of the pipe becomes greater than gravity. Since the surface of the pipe strongly pulls the liquid crystal, it is very difficult to flow the liquid crystal through the pipe. Therefore, there is a great demand of developing an apparatus and a method of injecting the liquid crystal into the hollow optic fiber to overcome the interaction between the liquid crystal and the inside surface of the optic fiber in order to inject the liquid crystal into the long hollow optic fiber having a diameter of several micrometers.

The discussion in this section is to provide general background information, and does not constitute an admission of prior art.

SUMMARY

An aspect of the present invention provides an apparatus and a method for injecting liquid crystal into a hollow optic fiber in a short time with uniform state without generating air bubbles by making the inside of the long hollow fiber vacuous before injecting the liquid crystal in order to overcome resisting force generated by a surface tension of the liquid crystal and an inside surface of the hollow fiber.

One aspect of the present invention provides an apparatus of injecting liquid crystal into a hollow optic fiber, including: a first holder and a second holder each of which has a fluid passage for holding corresponding one end of the hollow optic fiber to be communicated with the fluid passage; a container connected to a tube disposed with a valve at the fluid passage of the second holder and storing liquid crystal; an air supplying device connected to the first holder and the container through tubes having a plurality of valves to select an air passage for making the hollow optic fiber vacuous by sucking air out of the hollow optic fiber and forcedly injecting liquid crystal into the hollow optic fiber by supplying an air pressure.

Another aspect of the present invention provides a method of injecting liquid crystal into a hollow optic fiber using an apparatus for injecting liquid crystal into a hollow optic fiber, the method including the steps of: a) turning on an air supplying device, sucking air out of the hollow optic fiber using the air supplying device, and making the hollow optic fiber vacuous; and d) supplying an air pressure to a container storing the liquid crystal using the air supplying device, and injecting liquid crystal stored in the container into the vacuous hollow optic fiber using the air pressure.

Liquid crystal is forcedly injected into a hollow optic fiber in a short time with uniform state without generating air bubbles by making the inside of the long hollow fiber vacuous before injecting the liquid crystal in order to overcome resisting force generated by a surface tension of the liquid crystal and an inside surface of the hollow fiber.

BRIEF DESCRIPTION OF THE DRAWINGS

The above and other aspects and features of the present invention will become apparent from the following description of the embodiments given in conjunction with the accompanying drawings, in which.

DETAILED DESCRIPTION OF EMBODIMENTS

Figure 1:
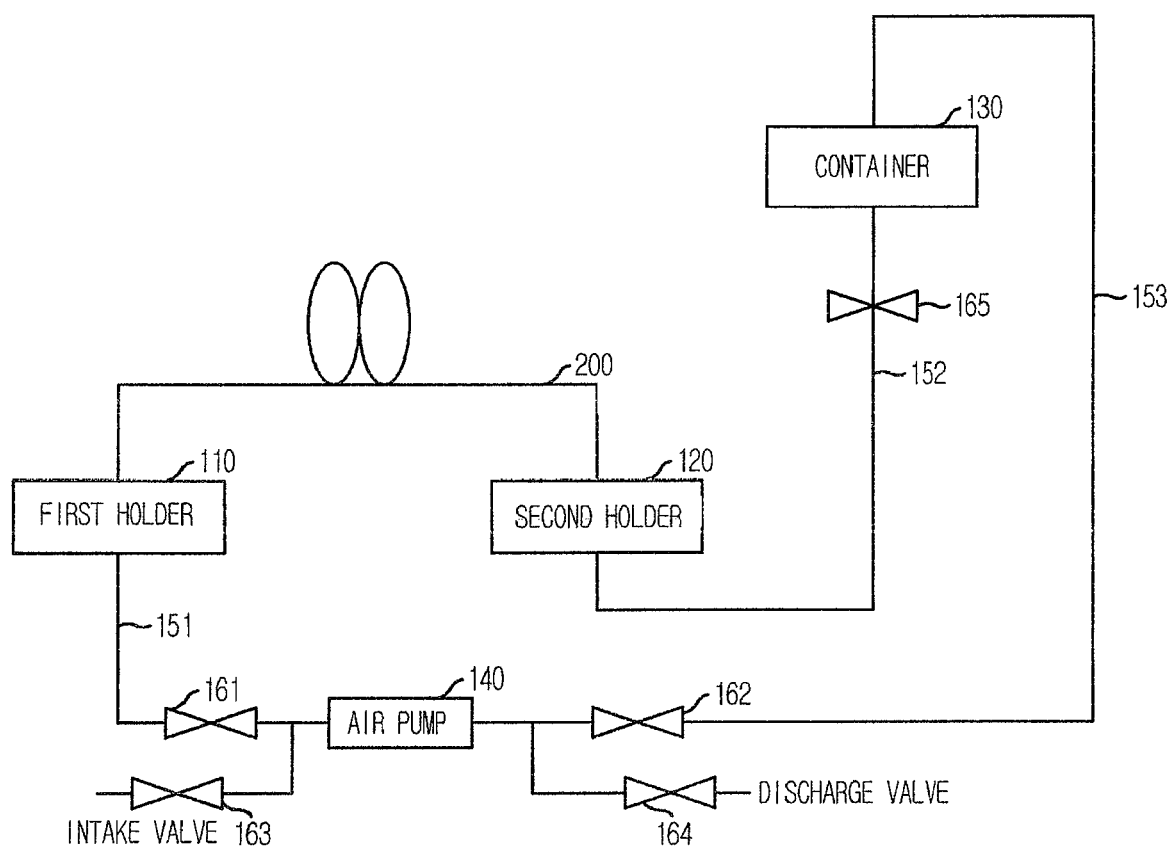
FIG. 1 is a diagram illustrating an apparatus of injecting liquid crystal into a hollow optic fiber in accordance with an embodiment of the present invention.
Figure 2:
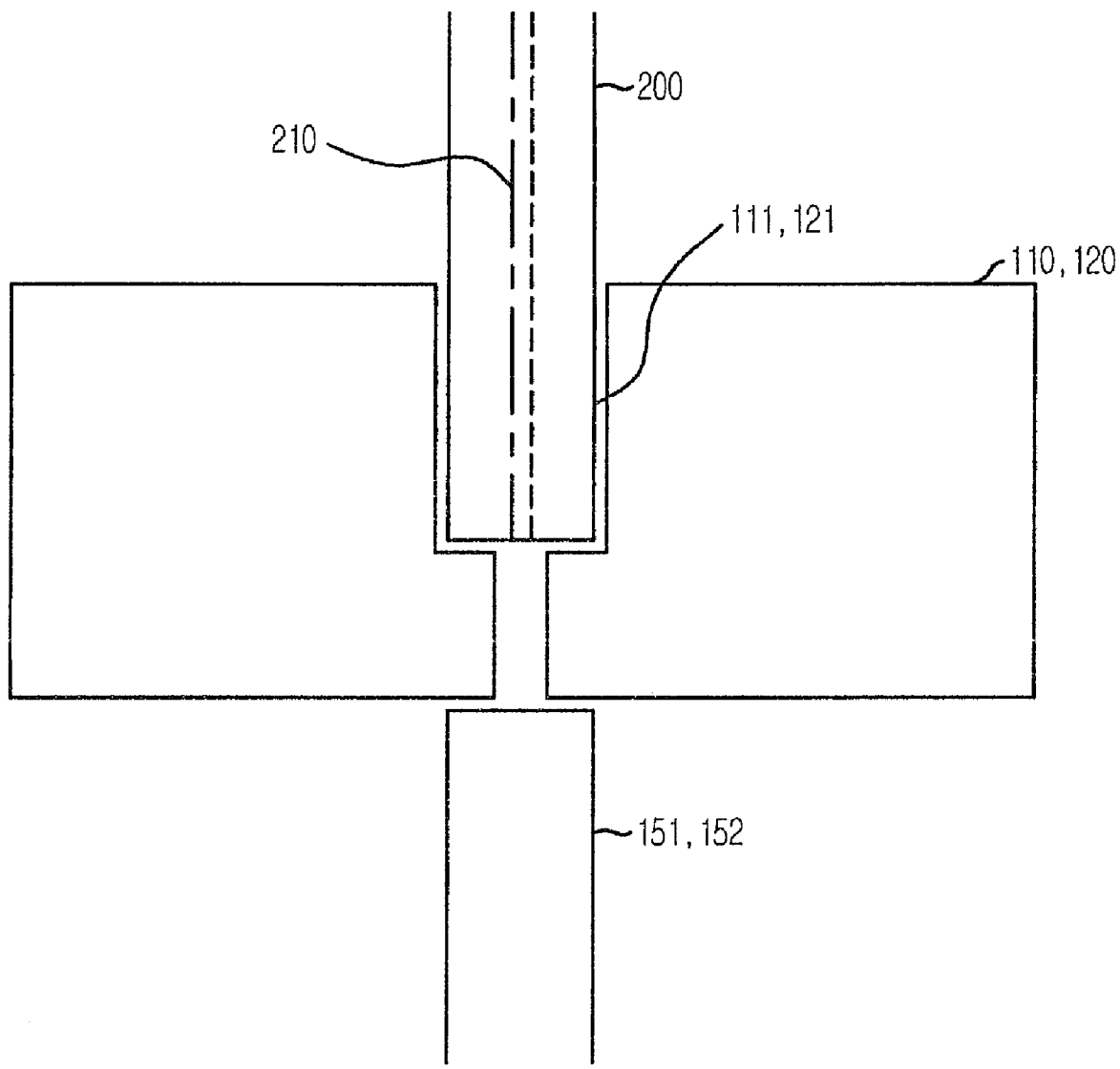
FIG. 2 is a diagram showing a holder of the apparatus shown in FIG. 1.
Figure 3:
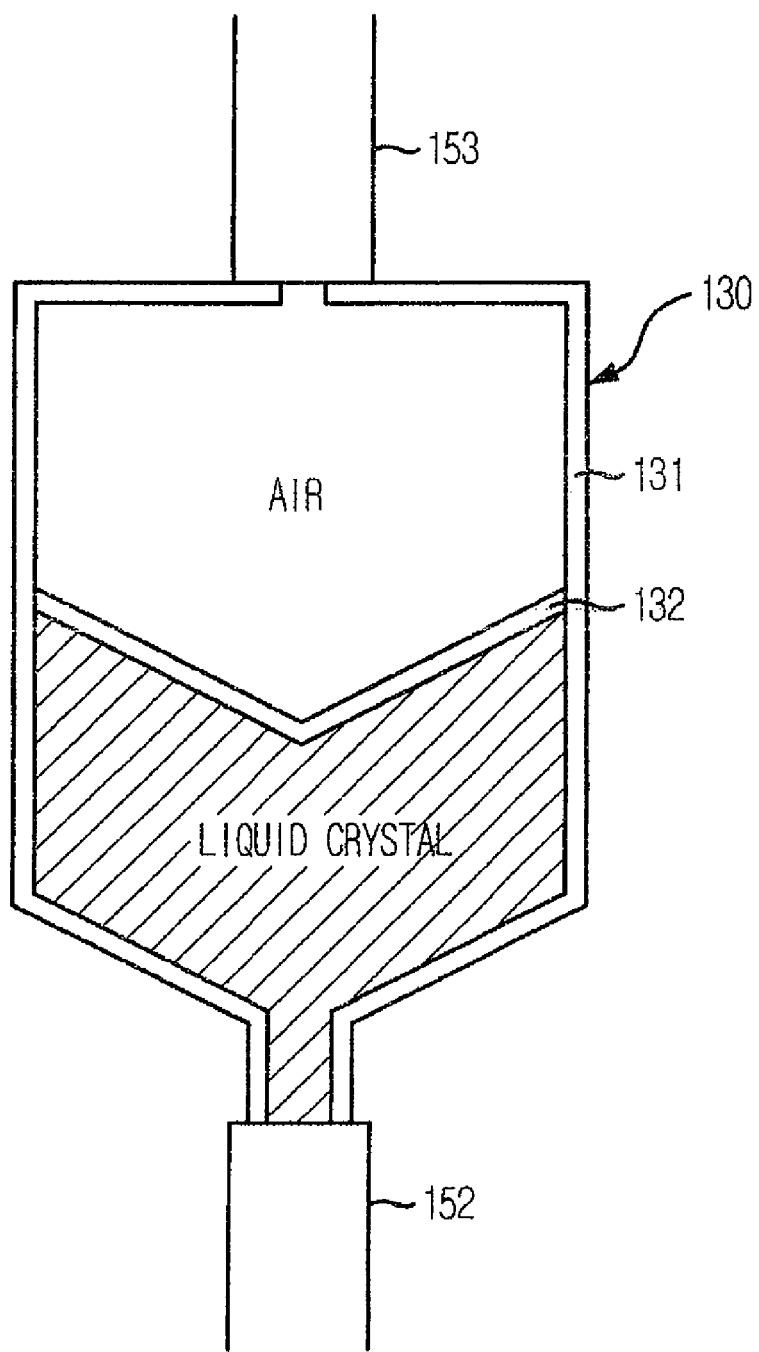
FIG. 3 shows a container for liquid crystal in the apparatus shown in FIG. 1.

Embodiments of the invention will be described with reference to the accompanying drawings, which is set forth hereinafter. FIG. 1 is a diagram illustrating an apparatus of injecting liquid crystal into a hollow optic fiber in accordance with an embodiment of the present invention, FIG. 2 is a diagram showing a holder of the apparatus shown in FIG. 1 and FIG. 3 shows a container for liquid crystal in the apparatus shown in FIG. 1.

As shown in FIG. 1, the apparatus 100 of injecting liquid crystal into a hollow optic fiber includes a first holder 110 for holding one end of a hollow optic fiber 200 and connected to a tube to suck the air out of the inside hollow optic fiber; a second holder 120 for holding other end of the hollow optic fiber 200 and connected to a tube to inject liquid crystal into the hollow optic fiber 200; a container 130 for storing liquid crystal; an air pump 140 for sucking air out of the hollow optic fiber to make the inside of the hollow optic fiber vacuous and supplying air pressure to the container to inject the liquid crystal into the hollow optic fiber; and the tubes for connecting the elements of the apparatus.

The apparatus 100 further includes: a first valve 161 disposed between the first holder 110 and the air pump 140 for controlling a path of the air sucked by the air pump 140; a second valve 162 disposed between the second holder 120 and the air pump 140 for controlling a path of the air pumped by the air pump 140; and an intake valve 163 and a discharge valve 164 disposed at tubes sucking and discharging the air from/to the air pump 140 for blocking inflow and outflow of the air from the exterior.

The first and the second holders 110 and 120 for holding both ends of the hollow optic fiber 200 may be separately manufactured. However, the first and the second holders 110 and 120 can be integrally manufactured by allowing the tubes coupled to the hollow optic fiber 200 to be connected to different locations of the first and the second holders 110 and 120.

Hereinafter, operations and relations of constituent elements of the apparatus for injecting liquid crystal into the hollow optic fiber according to an embodiment of the present invention will be described.

As shown in FIG. 2, the first holder 110 is a rectangular parallelepiped block made of metal or $SiO_2$ which have small thermal expansion coefficient. A hole 111 is formed at the center of the first holder 110 to have slightly larger diameter than the diameter of the hollow optic fiber 200 so as to receive the hollow optic fiber 200 from an upper direction. The hole 111 is a two-stepped hole as shown in FIG. 2. That is, a lower portion of the hole 111 has smaller diameter than an upper portion of the hole 111. The lower portion of the hole 111 has a slightly larger diameter than the core 210 of the hollow optic fiber 200. Accordingly, one end of the hollow optic fiber 200 is inserted until a threshold formed by the lower portion having the smaller diameter. While inserting the hollow optic fiber 200 into the hole 111, the core 210 of the hollow optic fiber 200 is exactly matched with a center of the lower portion. Such a hole 111 is a path of flowing fluid or air.

The lower portion of the hole 111 is connected to the air pump 140 through the first tube 151. Accordingly, when the air pump 140 is turned on, the air pump 140 sucks the air out of the hollow optic fiber 200 through the hole 111. While sucking the air out of the hollow optic fiber 200, the hole 111 may hold the hollow optic fiber 200 as like as an air chuck.

The second hollow optic fiber holder 120 is formed of same shape and material to the first hollow optic fiber holder 110. Other end of the hollow optic fiber is inserted into a hole 121 formed in the second hollow optic fiber holder 120. That is, the hole 212 is also two-stepped hole as like as the hole 111, which has an upper portion having a larger diameter than a lower portion. The lower portion of the hole 212 is connected to the container 130 through the second tube 152. Therefore, the liquid crystal in the container 130 is injected into the hollow optic fiber 200 through the second tube 152 and the hole 121.

As shown in FIG. 3, the container 130 has a sealed structure for storing the liquid crystal. The container 130 made of silica material having a strong intensity and low thermal expansion coefficient. It is preferable that the container 130 is formed of transparent material to see the level of stored liquid crystal in the container 130.

The container 130 has a shape of a syringe and is made of glass. The container 130 includes a cylinder 131 for containing the liquid crystal and a piston 132 for pressuring and pushing the stored liquid crystal using the air pressure from the air pump 140. The cylinder 131 is a hollow column shape which is made of transparent silica material, and one end of the cylinder 131 is a con shape. That is, the one end of the cylinder 131 is has a shape gradually narrowed in a length direction. The cone shaped end of the cylinder 131 is connected to the tube 152 coupled to the second holder 120.

Scales are represented on the outer surface of the cylinder 131 for reading the level of the stored liquid crystal, and a hole (not shown) with a screw is formed on the outside of the cylinder 131 to supply the liquid crystal from an external container to the cylinder 131 by unscrewing the screw of the hole. Other end of the cylinder 131 is connected to the third tube 153 coupled to the air pump 140 so as to transfer the air pumped from the air pump 140 to the piston in the cylinder 131.

The piston 132 is moved along the inside wall of the cylinder 131. The piston 132 has a shape of a con or a disk. The piston 132 receives an air pressure from the air pump 140 and transfers the air pressure to the liquid crystal. That is, the piston 132 pushes the liquid crystal in a direction of the second tube 152 using the air pressure from the air pump 140.

The air pump 140 sucks the air out of the hollow optic fiber 200 to make the inside of the hollow optic fiber 200 vacuous. Simultaneously, the air pump 140 pumps the air to pressurize the container 130 in order to inject the liquid crystal to the inside of the hollow optic fiber 200. The first tube 151 with the first valve 161 is connected to an inlet of the air pump 140, and the third tube 153 with the second valve 162 is connected to the outlet of the air pump 140. The intake valve 163 is connected to the first tube 151 formed between the first valve 161 and the inlet of the air pump 140 through a tube branched from the first tube 151 formed between the first valve 161 and the inlet as shown in FIG. 1. Also, the discharge valve 164 is connected to the third tube 153 formed between the second valve 162 and the outlet of the air pump 140 through a tub branched from the third tube 153 formed between the second valve 162 and the outlet as shown in FIG. 1. Therefore, the air flow path can be selectively controller by opening or closing each of the valves 161 to 165.

Since the inside volume of the hollow optic fiber 200 is very small, a time for operating the air pump 140 is also very short. Therefore, it is preferable to include an automatic controller for automatically controlling the air pump 140 and the valves 161 to 165 to select a target air flow path. That is, the automatic controller according to an embodiment of the present invention automatically controls the air pump 140 and an opening and a closing operation of each of valves 161 to 165 in order to suck the air out of the hollow optic fiber 200 so as to make the inside of the hollow optic fiber 200 vacuous. Or, the automatic controller automatically controls the air pump 140 and an opening and a closing operation of each of valves 161 to 165 in order to inject the liquid crystal into the hollow optic fiber 200. Such an automatic controller can be embodied using a typical method.

Hereinafter, a method of injecting liquid crystal into a hollow optic fiber using the apparatus shown in FIG. 1 according to an embodiment of the present invention will be described.

The method of injecting liquid crystal into the hollow optic fiber mainly includes a step of making the inside of the hollow optic fiber 200 vacuous and a step of injecting the liquid crystal into the hollow optic fiber 200 using the air pressure.

At first, the step of making the inside of the hollow optic fiber 200 vacuous will be described as follows. The hollow optic fiber 200 is cut to have a perpendicular section after stripping and clipping the hollow optic fiber 200. Then, both ends of the hollow optic fiber 200 are inserted into holes 111 and 121 formed on the first holder 110 and the second holder 120, respectively, until the ends of the hollow optic fiber 200 reached the threshold formed inside the holes 111 and 121.

In order to suck the air out of the hollow optic fiber 200, the intake valve 163 is closed and the first valve 161 is opened. Herein, the intake value 163 is connected to the tube to the exterior, and the first valve 161 is connected between the inlet of the air pump 140 and the hollow optic fiber 110. Also, the discharge valve 164 is opened and the second valve is closed. Furthermore, the third valve 165 is closed. After completely opening and closing these valves 161 to 165, the air pump 140 is turned on to suck the air out of the hollow optic fiber 200. As a result, the hollow optic fiber 200 forms a vacuum.

Hereinafter, the step of injecting the liquid crystal into the hollow optic fiber 200 using the air pressure will be described. After the hollow optic fiber 200 forms a vacuum, the valves 161 to 165 are controlled to supply the air pressure to the container 130 in order to inject the liquid crystal stored in the container 130 into the hollow optic fiber 200.

That is, the intake valve 163 is opened, and the first valve 161 is closed. Then, the discharge valve 162 is closed, and the second valve 162 is opened. Also, the third valve 165 is gradually opened.

After completely operating these valves 161 to 165, the air pump 140 is turned on. The air pump 140 sucks the air through the intake valve 163 and directly transfers the air to the piston 132 of the container 130 through the third tube 153.

Then, the piston 132 receives the air pressure from the air pump 140 and pushes the liquid crystal stored in the cylinder 131 to the second holder 120 that is connected to the hollow optic fiber 200. Herein, the flow of the liquid crystal may be controlled by controlling the length of the second tube 152 which is connected to the second holder 120. After completely injecting the liquid crystal into the hollow optic fiber 200, the opened valves are closed and the air pump 140 is turned off. Then, the liquid crystal charged hollow optic fiber 200 is separated from the first and the second holders 110 and 120.

While embodiments of the present invention has been described, it will be apparent to those skilled in the art that various changes and modifications may be made without departing from the scope of the invention as defined in the following claims.

What is claimed is:

1. An apparatus of injecting liquid crystal into a hollow optic fiber, comprising:
   a first holder and a second holder each of which has a fluid passage for holding corresponding one end of the hollow optic fiber to be communicated with the fluid passage
   a container connected to a tube disposed with a valve at the fluid passage of the second holder and storing liquid crystal; and
   an air supplying device connected to the first holder and the container through tubes having a plurality of valves to select an air passage for making the hollow optic fiber vacuous by sucking air out of the hollow optic fiber and forcedly injecting liquid crystal into the hollow optic fiber by supplying an air pressure.

2. The apparatus as recited in claim 1, further comprising an automatic controller for selecting an air passage by automatically controlling the air supplying device and the valves.

3. The apparatus as recited in claim 1, wherein the fluid passages of the first holder and the second holder are a two-stepped hole divided to an upper portion hole having a diameter larger than the diameter of the hollow optic fiber and a lower portion hole having a diameter larger than a core of the hollow optic fiber to receive and to hold the end of the hollow optic fiber.

4. The apparatus as recited in claim 1, wherein the container includes a cylinder for storing the liquid crystal, and a piston for receiving an air pressure from the air supplying device and pushing the liquid crystal stored in the cylinder.

5. A method of injecting liquid crystal into a hollow optic fiber using an apparatus for injecting liquid crystal into a hollow optic fiber, the method comprising the steps of:

a) turning on an air supplying device, sucking air out of the hollow optic fiber using the air supplying device, and making the hollow optic fiber vacuous; and d) supplying an air pressure to a container storing the liquid crystal using the air supplying device, and injecting liquid crystal stored in the container into the vacuous hollow optic fiber using the air pressure.

6. The method of claim 5, wherein the apparatus for injecting liquid crystal includes:

a first holder and a second holder each of which has a fluid passage for holding corresponding one end of the hollow optic fiber to be communicated with the fluid passage a container connected to a tube disposed with a valve at the fluid passage of the second holder and storing liquid crystal; and an air supplying device connected to the first holder and the container through tubes having a plurality of valves to select an air passage for making the hollow optic fiber vacuous by sucking air out of the hollow optic fiber and forcedly injecting liquid crystal into the hollow optic fiber by supplying an air pressure.

* * * * *